Aug. 15, 1939.  A. L. CURRY  2,169,636
COUPLING
Filed Sept. 28, 1937  4 Sheets-Sheet 1
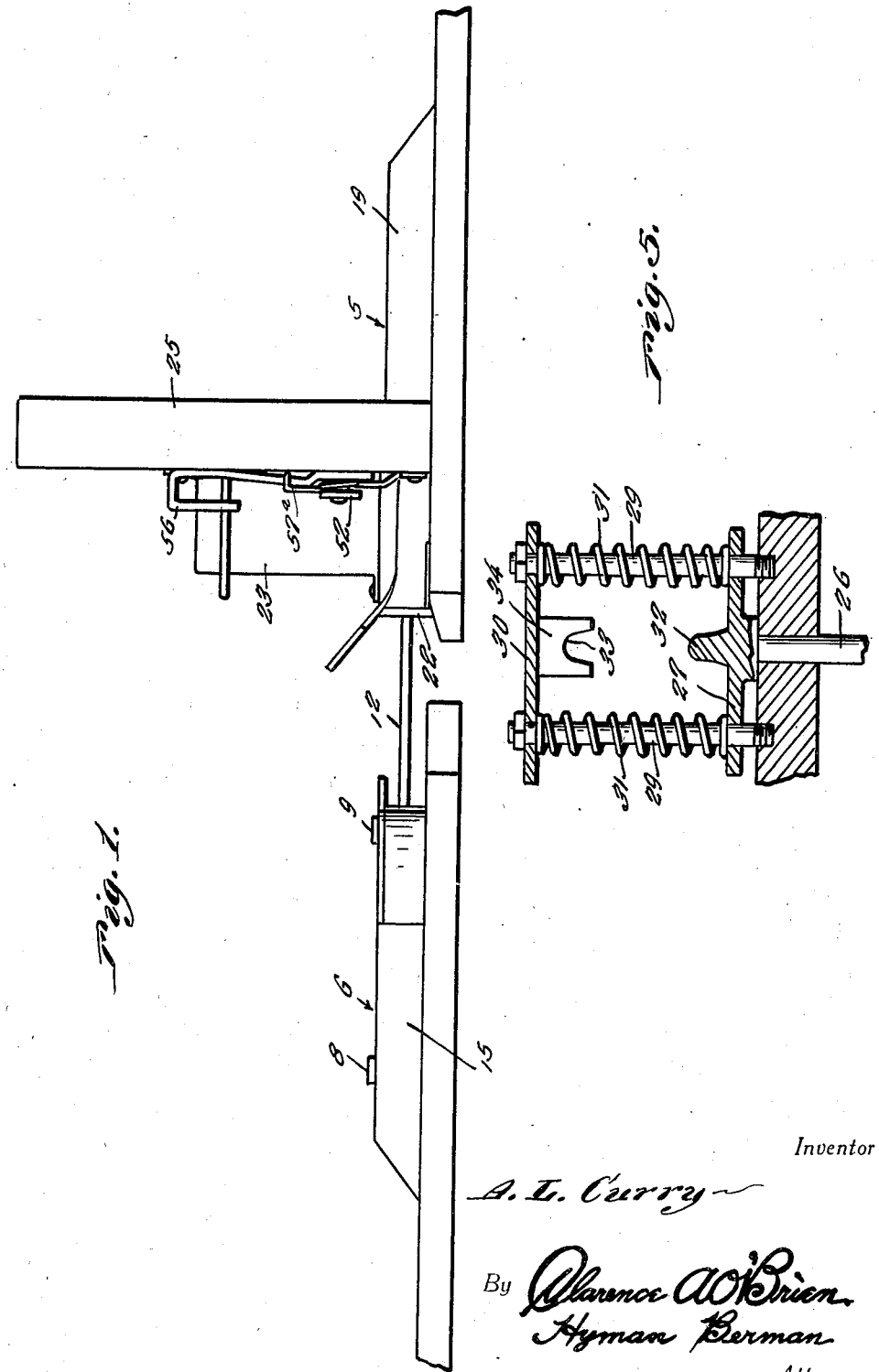
Inventor
A. L. Curry
By Clarence A. O'Brien
Hyman Berman
Attorneys

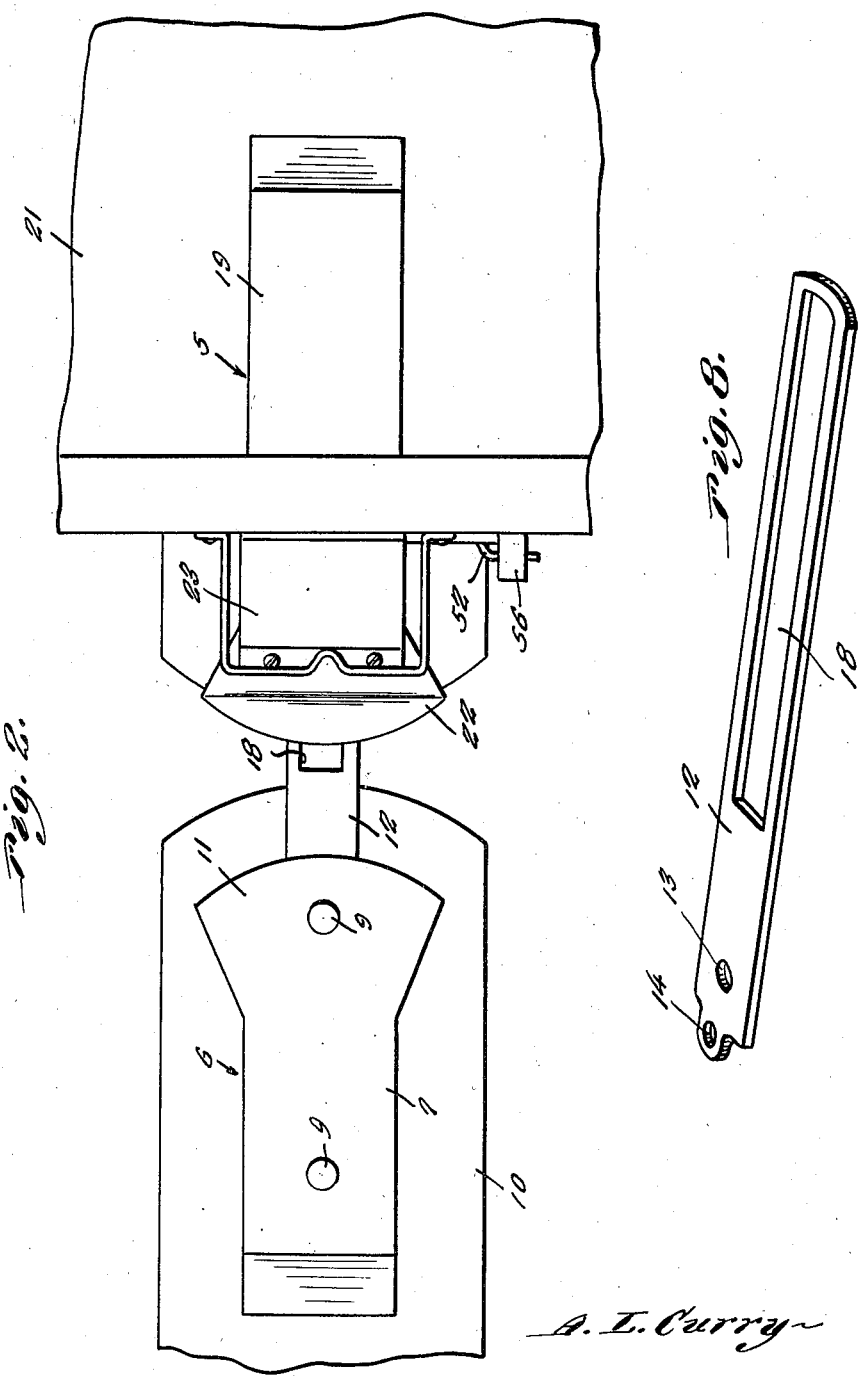

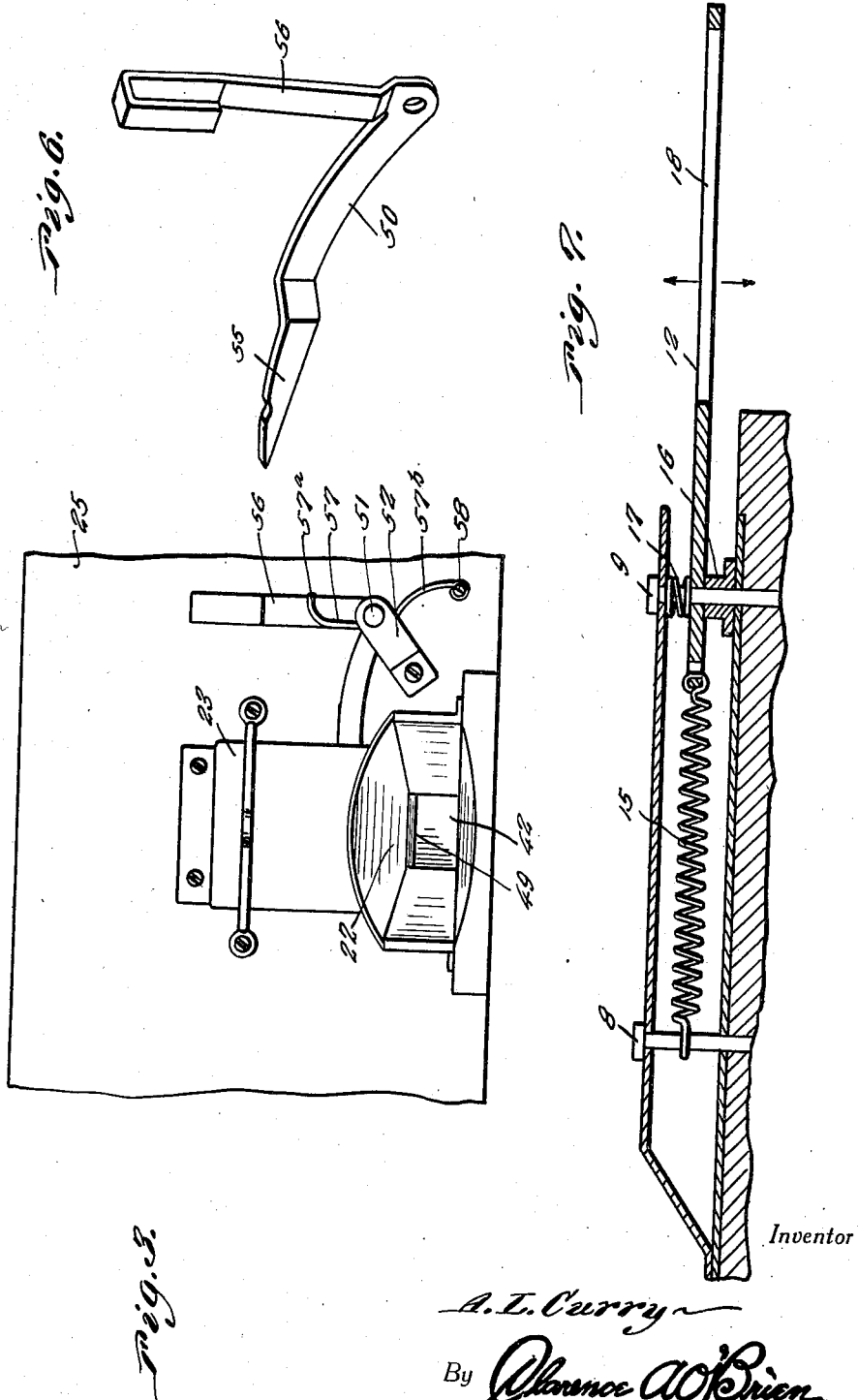

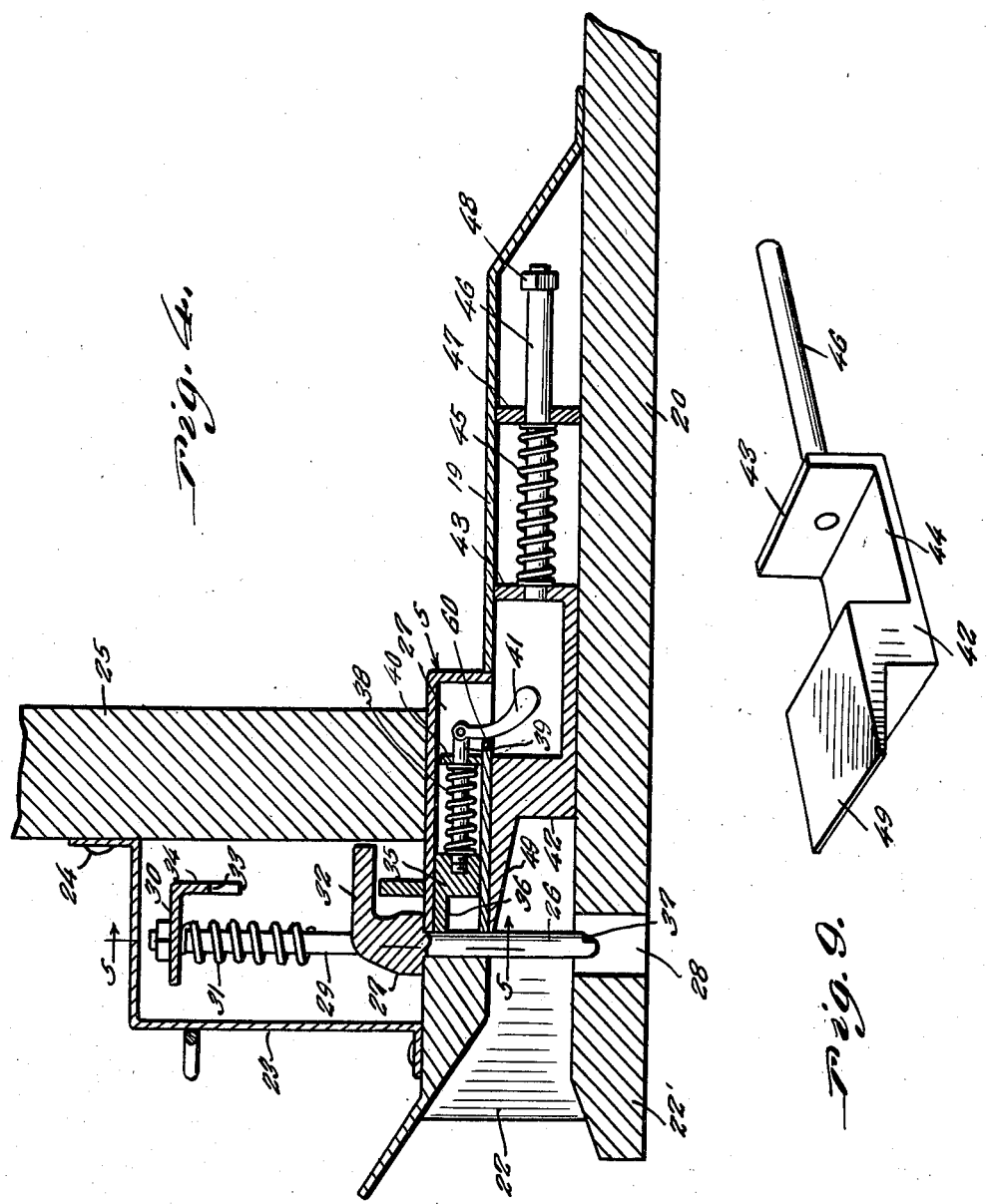

Patented Aug. 15, 1939

2,169,636

UNITED STATES PATENT OFFICE 2,169,636

COUPLING

Arnold Lee Curry, Lundale, W. Va., assignor of one-third to Hardin Wright, Lundale, W. Va.

Application September 28, 1937, Serial No. 166,177

1 Claim. (Cl. 280—33.15)

This invention relates to couplings, more particularly draft couplings, and an object of the present invention is to provide a coupling of this character which may be used with equal efficiency for coupling mine cars, logging cars, motor trucks, and which may also be used as a trailer coupling.

The invention together with its objects and advantages will be best understood from a study of the following description taken in connection with the accompanying drawings wherein:

Figure 1 is a side elevational view of the coupling.

Figure 2 is a top plan view thereof.

Figure 3 is an end elevational view of the operating coupler-head.

Figure 4 is a vertical sectional view through the operating coupler-head.

Figure 5 is a detail sectional view taken substantially on the line 5—5 of Figure 4.

Figure 6 is a perspective view of a release lever.

Figure 7 is a longitudinal sectional view through the link coupler-head.

Figure 8 is a perspective view of a coupling link, and

Figure 9 is a perspective view of a sliding trip member.

Referring to the drawings by reference numerals it will be seen that in the preferred embodiment thereof the coupling comprises an operating coupler-head indicated generally by the reference numeral 5 and a link coupler-head indicated generally by the reference numeral 6.

The link coupler-head 6 comprises a relatively flat narrow elongated casing 7 that is secured by bolts or similar fastening elements 8 and 9 to the draft bar 10 of one of the vehicles to be coupled together.

At the open end thereof the casing 7 is flared as at 11, and the bolt 9 serves as a pivot for a coupling link 12 which adjacent one end thereof is apertured as at 13 to accommodate the bolt 9, and at said end is also provided with an apertured lug or extension 14 through the medium of which one end of a coil spring 15 is connected with said link. The other end of the coil spring 15 is engaged with the bolt 8 which latter also serves as an anchoring means for the spring 15.

Disposed about the bolt 9 and providing a rest or support for the pivoted end of the link 12 is a collar 16, while disposed on the bolt 9 and interposed between the link 12 and the top wall of the mouth 11 of the casing 7 is a coil spring 17 which yieldably acts on the pivoted end of the link 12 to seat the latter on the collar 16.

The link 12 is provided with an elongated slot 18 for a purpose hereinafter made manifest.

The operating coupler-head 5 comprises a casing 19 of metal or other suitable material mounted on the draft bar 20 of a second vehicle 21 and having an open end arranged directly behind and in line with a flared head 22 provided on one end of the draft bar 20 and serving as an entrance mouth for the casing 19 of the operating coupler-head 5.

Also mounted above the mouth 22 forming part of the coupler-head 5 is a casing 23 which is also bolted or otherwise secured as at 24 to a body part 25 of the vehicle 21. The casing 23 forms a housing for a locking pin 26 that works through the top of the casing 19 at one end of a chamber 27 provided in said casing, and also through an opening 28 provided in the draft bar 20 immediately rearwardly of the entrance mouth 22.

At the upper end thereof the locking pin 26 is provided with a cross-head 27 that is apertured to accommodate a pair of fixed guide rods 29 arranged within the casing 23 and connected at their upper ends by a cross-bar 30. (See Figure 5.)

Disposed about the guide rods 29 and bearing on the cross-head 27 for urging pin 26 downwardly are coil springs 31.

Cross-head 27 of the pin is also provided with a lateral lug or extension 32 which is received within the notch 33 of a depending stop lug 34 provided on the cross-bar 30 when the pin 26 is in a fully raised position.

For releasably securing the locking pin 26 in its extreme raised position there is slidably mounted in the chamber 27 of the operating coupler-head a slide member 35 that at one end thereof is provided with a lip or projection 36 adapted to engage in a notch 37 in the free or lower end of the pin 26 when the latter is in the aforementioned extreme raised position.

The latch member 35 is normally urged into a position to engage the lip 36 thereof with the notch 37 of pin 26 through the medium of a coil spring 38 that is disposed about a rod 39 and impinges at one end against the slide 35 and at a relatively opposite end against an apertured guide 40 through which the rod 39 works, rod 39 being threaded or otherwise secured at one end thereof in engagement with the slide 35.

At the free end thereof rod 39 has pivoted thereto a lever 41 that extends downwardly through the bottom of the compartment or chamber 27 to be accommodated between a pair of abutments 42, 43 carried by a slide plate 44 that has a sliding fit within the casing 19 as shown in Figure 4.

The slide member 44 is normally urged to a projected position through the medium of a coil spring 45 that is disposed about a rod 46 and impinges at one end against the abutment 43 and at a relatively opposite end against an apertured guide 47 through which the rod 46 works.

Rod 46 at one end thereof is suitably secured to the abutment 43 of the slide 44, and the free end thereof is provided with a stop collar 48.

Abutment 43 has extending forwardly therefrom a plate-like extension 49 that normally is arranged in the path of the pin 26 so that normally the pin 26 is held in a raised position by reason of the lower end of the pin 26 resting on the plate-like extension 49.

For raising the pin 26 there is provided a lever 50 that is pivoted adjacent one end thereof as at 51 to a bracket 52 suitably mounted on the aforementioned part 25 of the vehicle 21.

The lever 50 has an offset cam-like end 55 that extends through one side of the casing 23 beneath the lug extension 32 of pin 26 for engaging said extension 32 to raise the pin 26 upon a swinging movement of the lever 50 in a clockwise direction (see Figure 3).

At the pivoted end thereof lever 50 is provided with a suitable handle 56.

A spring 57 has the coiled intermediate portion thereof disposed about the pivot 51 while one end 57a of the spring engages the handle 56 and the other end 57b of the spring is connected to the body part 25 of the vehicle as at 58. Thus it will be seen that spring 57 tends normally to rock or rotate the lever 50 in a counter-clockwise direction.

The utility, advantages and operation of a coupling embodying the features of the present invention will be apparent from the following:

Normally pin 26 is in a raised position so that the lower end thereof rests on the plate-like extension 49 of slide 44 which latter under action of spring 45 is normally in a projected position.

To couple the two vehicles 10 and 21 together the slotted end of link 12 enters the mouth 22 of the operating coupler-head 5 and engages the abutment 42 forcing slide 44 to the right in Figure 4 against the action of spring 45 until the plate-like extension 49 of the slide clears the lower end of pin 26 whereupon the latter, under action of spring 31, will move downwardly through the slot 18 in the link 12 and into the opening 28 thus effecting a coupling of the vehicles.

To uncouple the vehicles the operator by gripping handle 56 swings the lever 50 upwardly or in a clockwise direction so that the end 55 of the lever engages the lug extension 32 of pin 26 causing the pin to move upwardly until the lug 32 engages the notched stop lug 33 at which point notch 27 will be in line with the extension 36 of latch 35 which, under action of spring 38 will spring into engagement with the notch 37 thus releasably holding the pin 26 in this raised position.

However it will be noted that as the link 12 is withdrawn through the mouth 22 of the coupler-head 5 slide 44 under action of spring 45 will be forced toward the left in Figure 4, and when abutment 43 engages the lever 41 of rod 39, the lever 41 fulcruming at the point 60 will cause the slide 35 to retract, or in other words to slide toward the right in Figure 4 thus withdrawing the extension 36 of the slide from out of engagement with the notch 37. This will release the pin 26 which under action of springs 31 will then move downwardly through the bottom of the chamber 27 and come to rest on the plate extension 49 of slide 44 which will at that time be in its extreme projected or forward position, which is the extreme position at the left in Figure 4. Thus the plate extension 49 will serve to hold the pin 26 in a raised position, whereupon the parts are now in a position to again receive the link 12 when a recoupling of the vehicles is desired.

From the above it will be seen that I have provided a coupling device which may be used on railway cars, mine cars, or on trucks and trailers, and which will be efficient in operation and meet the requirements of a coupling device of this character.

Having thus described the invention what is claimed as new is:

In a coupler of the character described, an operating coupler-head, a link coupler-head having a link pivotally associated therewith, said link having a free end adapted to be inserted into said operating coupler-head, the free end of said link being provided with a slot, a slide member in said operating coupler-head having an abutment at its outer end to be engaged by said link to move inwardly of the operating coupler-head incidental to an insertion of the slotted end of the link into said operating coupler-head, an outwardly extending projection on the upper part of the abutment, a vertically movable coupling pin having a lower end resting on said projection when the slide is in projecting position, spring means for projecting the slide member, spring means engaged with said coupling pin for normally urging the latter downwardly, means for manually raising said coupling pin, a second spring-pressed slide member located above the first-mentioned slide member for holding the pin in raised position with its lower end above the projection of the first slide member, a depending lever pivotally connected with the second slide member, a second abutment on the inner end of the first slide member for engaging the lever as the first slide member approaches the end of its outward movement, for moving the second slide member to a position to release the pin to permit the pin to engage the projection of the first slide member and a stationary fulcrum part in front of an intermediate part of the lever for causing the lever to move the second slide member to pin releasing position when the lever is engaged by the second abutment.

ARNOLD LEE CURRY.